Patented Apr. 13, 1937

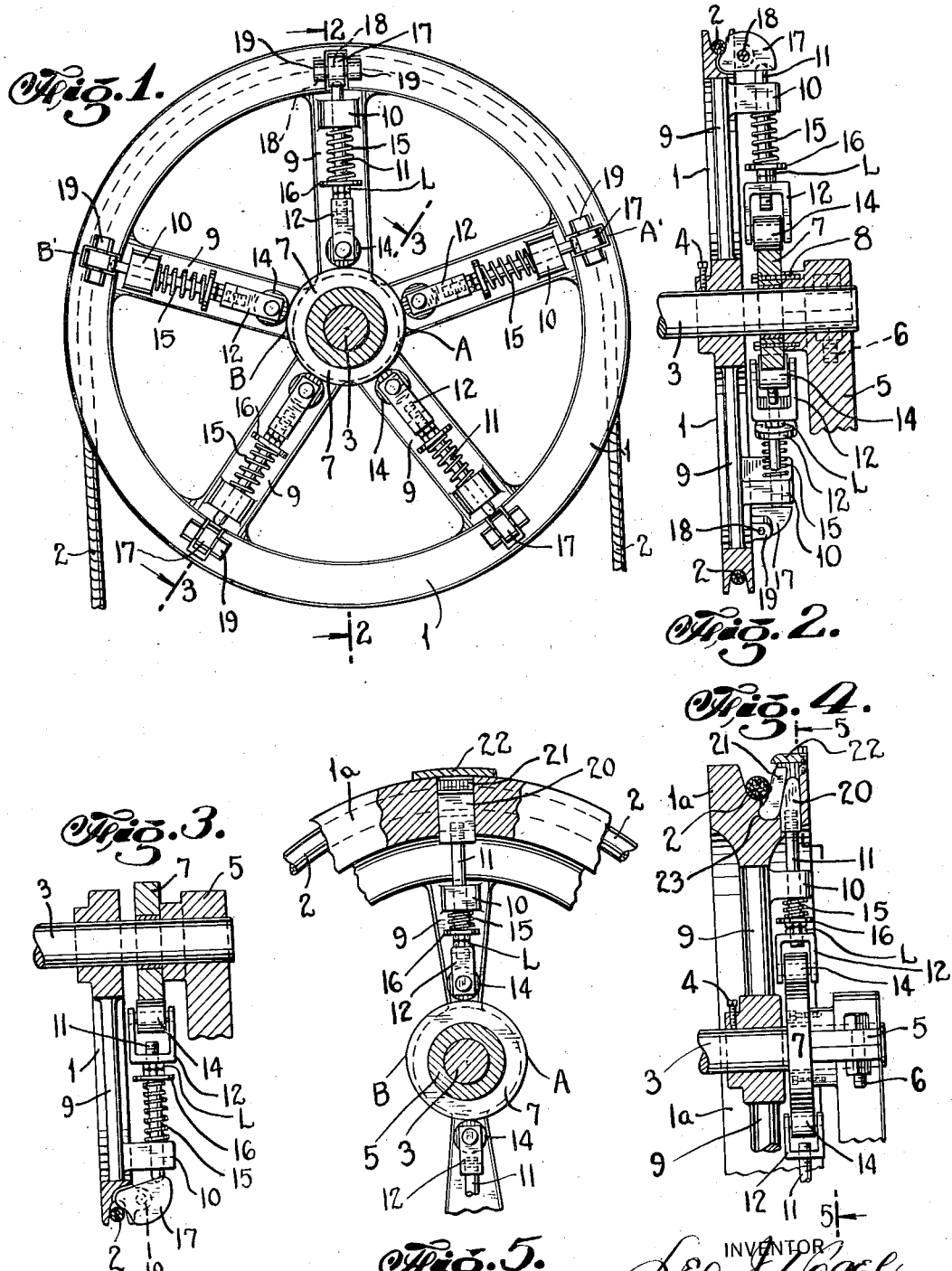
April 13, 1937. L. J. VOGEL 2,076,687
PULLEY CONSTRUCTION
Filed Aug. 23, 1935

2,076,687

UNITED STATES PATENT OFFICE 2,076,687

PULLEY CONSTRUCTION

Leo J. Vogel, South Hills, Pittsburgh, Pa.

Application August 23, 1935, Serial No. 37,465

4 Claims. (Cl. 74—230.24)

My invention relates to a new and improved drive pulley construction.

One of the objects of my invention is to provide a pulley which can be driven by means of a rope or belt or chain or cable or the like, or which can be turned to drive a belt or rope or chain or cable or the like, whereby a firm gripping contact is secured between the rope or other drive member, and that portion of the surface of the pulley, which is in contact with the rope or the like. This device is particularly useful for driving the supporting cable of a mono-cable aerial tramway, or the pull rope of a bi-cable aerial tramway, or any operating cable or rope.

Another object of my invention is to provide a releasable engaging means between the rope and a suitable portion of the periphery of the pulley.

Another object of my invention is to provide a device of this type which is simple to construct and to operate.

Other objects of my invention will be set forth in the following description and drawing, which illustrate preferred embodiments thereof, it being understood that the above general statement of the objects of my invention is intended generally to illustrate the same, and without limiting it in any manner.

Fig. 1 is a side elevation, partially in section, showing the improved device.

Figs. 2 and 3 are respectively sectional views on the lines 2—2 and 3—3 of Fig. 1.

Fig. 4 is an end elevation, partially in section, showing a modified device.

Fig. 5 is a sectional view, partially in elevation on the line 5—5 of Fig. 4.

Referring to Fig. 1, this shows a pulley 1 which drives or is driven by a rope 2, or any other suitable member. The member 2 may be a steel cable or the like.

The pulley 1 is mounted on or connected to a shaft 3, so that the shaft 3 turns in unison with the pulley 1, or shaft 3 can remain stationary while pulley 1 turns. The pulley 1 can be connected to the shaft 3 by means of set screws 4, whose points may enter suitable recesses in the shaft 3, or by any other conventional means, if it is desired to have shaft 3 and pulley 1 turn in unison.

The shaft 3 is mounted in a suitable bearing 5. As shown in greater detail in Fig. 4, this bearing is of the ordinary split type, the two parts of the bearing being connected by suitable bolts 6.

A stationary cam 7 is connected to the bearing 5 by any suitable means, such as bolts 8.

The pulley 1 is provided with any suitable number of radial arms 9 which preferably make equal angles with each other. There may be any number of said radial arms 9. As shown in Fig. 2, each one of said radial arms 9 is provided with a transverse lug 10, which is perforated so as to slidably guide a plunger 11. At its inner end, each plunger 11 is provided with a fork 12 and each said fork 12 is provided with a roller 14 which rides against the surface of the cam 7. Each said plunger 11 is provided with a spring 15. One end of each spring 15 abuts the inner lateral surface of the corresponding lug 10, and the other end of said spring 15 abuts the head 16 which is provided on the plunger 11. Said springs 15 keep rollers 14 in contact with cam 7.

If desired, the member 16 may be a washer which is adjustably mounted upon the plunger 11 by means of locknuts L which can be adjustably connected to the plunger 11. For this purpose, the inner end of the plunger 11 can be externally threaded and the fork 12 may have a bore which is internally threaded.

The adjustable mounting of the member 16 on the plunger 11, regulates the gripping action of the member 17 against the rope or other member 2. That is, the members 11, 12 and 16 can be adjusted to each other, so as to control the grip of member 17, and the members 11, 12 and 16 are held in said adjusted position, by locknuts or other suitable means.

Each plunger 11 is associated with a gripping member 17, which is pivoted at 18 to the periphery or rim of the pulley 1. For this purpose, the periphery or rim of the pulley 1 is provided with lugs 19 at one face thereof, and each pivot pin 18 passes through a pair of lugs 19 and through the gripping member 17.

The outer end of each plunger 11 may be located in a recess which is provided in the adjacent face of the gripping member 17. The rim of the pulley 1 has one of its faces recessed and portions of the gripping members 17 are located in said recesses. For convenience, the right-hand side of the pulley 1 (referring to Fig. 2), may be designated as the inner face of said pulley 1.

The operation of the device is as follows:—

It is desired to provide a very firm grip between the member 2 and the pulley 1 along about one-half the circumference of the pulley 1, and to release this grip along the remainder of the periphery of the pulley 1. However, the member 2 can be gripped to the pulley 1, along an arc which is less or more than one-half the circumference of the pulley 1.

Referring to Fig. 1, the high portion of the cam is between the points A and B, proceeding in the counterclockwise direction. Hence, the grippers 17 are operated so as to grip the rope, by means of plungers 11, over approximately one-half the circumference of the cam 7.

The gripping of the rope or cable 2 to the pulley is independent of the direction in which the rope or cable 2 is actuated.

For example, in the embodiment shown in Fig. 1, the rope is gripped to the pulley between the points A' and B'.

Fig. 2 shows the operative or gripping position of the member 17, and Fig. 3 shows the inoperative or non-gripping position of the member 17.

Referring to Fig. 4, this shows the plungers 11 provided with tapered or wedge-shaped heads 20. These heads 20 reciprocate in radial recesses which are provided in the rim of the pulley. In this embodiment, the rim 1a of the pulley is provided with a series of rim members 22, each of which is associated with a head 20 of a plunger 11.

A series of gripping members 21 have their inner ends turnably located in recesses 23 which are provided in the rim 19. When the plungers 11 are moved outwardly, the inclined faces of said plungers 11 co-operate with the adjacent faces of the gripping members 21, so as to turn said gripping members 21 to the gripping position which is illustrated in Fig. 4.

The members 22 limit the movement of the members 21.

In the inoperative position of the member 20, the members 21 are allowed to turn away from the gripping position which is illustrated in Fig. 4.

I have shown preferred embodiments of my invention, but it is clear that various changes and omissions could be made from the details described, without departing from the spirit of the invention.

If desired, the plungers could be connected positively to the gripping members, so as to release said gripping members positively from the rope or cable, when the plungers are moved away from the rim of the pulley.

The walls of the gripping members which contact with the rope or cable 2, have a contour which corresponds to, or which is identical with, the corresponding wall of the rim of the pulley, in which the gripping members are located. The rim of the pulley has a groove of smooth concave cross-section, and the rope rests upon the wall of the pulley, preferably even at the points where the gripping members are located, so that the gripping members exert a lateral grip.

The use of the gripping members eliminates the necessity of a frictional grip between the rope and pulley, so that the pulley can drive a slack rope.

This is of particular importance in operating the cable of a monocable aerial tramway, or the pull cable of a bi-cable aerial tramway.

Ordinarily it is necessary to have the cable of a monocable aerial tramway passing around the drive pulley under tension. The improved drive pulley makes it possible to operate the pull cable of a bi-cable system, in transporting heavy loads in an upwardly inclined direction, even though the pull cable is relatively slack.

The rope contacts with the concave wall of the groove of the pulley along at least 135°–140° of the periphery of the rope. The inner faces of the gripping members are substantially aligned with the wall of the groove of the innermost portion of the wall of the pulley. Hence the rope is gripped by a lateral pincer action, between each gripping member and the upstanding inclined part of the opposite wall of the pulley groove. This construction minimizes the deformation of the rope by the gripping members, because the rope is always in contact with the innermost part of the wall of the pulley groove.

When a gripping member is forced to the operative position, about 135° of the adjacent periphery of the rope will retain a substantially true circular contour, which corresponds substantially to the contour of the groove of the rim of the pulley. The remainder of the periphery of the rope will be distorted by the gripping pressure from said circular contour. However, if the rope did not snugly abut a rigid wall of the pulley groove along about 135°–140°, the rope would be distorted throughout into elliptical form, which would lessen the gripping efficiency and lower the life of the rope.

That is, in the improved device, the rope abuts and is supported at all points of its contact with the concave wall of the groove of the pulley.

The gripping members are preferably located in slots which extend through a part of the wall of the grooved rim of the pulley. Said slots may be replaced by lateral recesses.

It will be noted that the gripping members are operated by devices which move parallel to the plane of turning of the pulley. I do not wish to be limited to this detail, as the invention covers a device in which gripping members are operated by reciprocating operating members. It is obvious that the claims also cover a driven pulley.

I have shown preferred embodiments of my invention but it is clear that numerous changes and omissions can be made without departing from its spirit.

I claim:

1. A drive pulley having a plurality of radial arms, radially-movable plungers mounted in said arms, a stationary cam associated with the inner ends of said plungers, springs maintaining the inner ends of said plungers in contact with said cam, and gripping members turnably connected to said pulley and operated by said plungers.

2. A drive pulley having a rim provided with a groove, a stationary cam associated with the central part of said pulley, plungers operated by said cam, said plungers being radially movable and being slidably mounted in bearings which are provided at a face of said pulley, said bearings being between the centre of the pulley and said groove, spaced gripping members located in spaced slots of said groove and operated by said outer ends of said plungers, said gripping members being turnable relative to said rim, and means urging said plungers against said cam.

3. A drive pulley having a rim which is provided with radial recesses, radially movable plungers having heads slidably located in said recesses, means for moving said plungers to-and-fro in radial directions, gripping members turnably located in said rim and actuated by said heads, said heads being tapered, the inner ends of said gripping members being located in recesses of the rim, and rim members for holding said gripping members within said rim.

4. A drive pulley having a rim which is provided with a groove, said groove having a wall of concave cross section, said wall having spaced openings therein, laterally movable gripping members located in said spaced openings, means for actuating said gripping members in a lateral direction, said laterally movable gripping members being shaped and located so that a rope which is located in said groove can rest throughout on the wall of said groove, save at said openings.

LEO J. VOGEL.